UNITED STATES PATENT OFFICE.

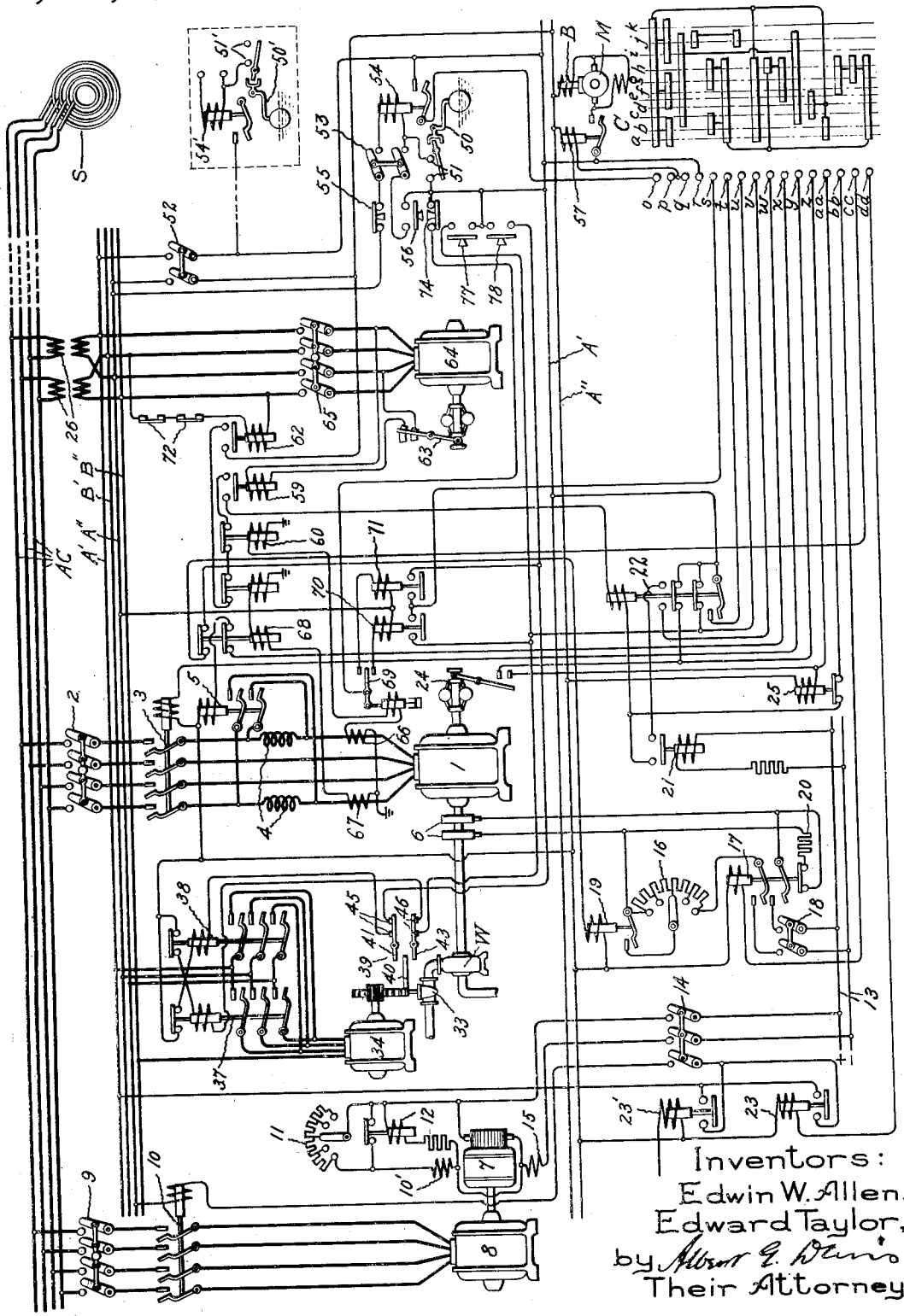

EDWIN W. ALLEN AND EDWARD TAYLOR, OF CHICAGO, ILLINOIS, ASSIGNORS TO GENERAL ELECTRIC COMPANY, A CORPORATION OF NEW YORK.

ELECTRIC SYSTEM OF DISTRIBUTION AND METHOD OF OPERATING THE SAME.

1,362,588. Specification of Letters Patent. Patented Dec. 21, 1920.

Application filed September 8, 1919. Serial No. 322,409.

*To all whom it may concern:*

Be it known that we, EDWIN W. ALLEN and EDWARD TAYLOR, citizens of the United States, residing at Chicago, county of Cook, State of Illinois, have invented certain new and useful Improvements in Electric Systems of Distribution and Methods of Operating the Same, of which the following is a specification.

Our invention relates to an electrical system of distribution and method of operating the same and more particularly to automatic prime mover dynamo plants and their operation.

Our invention finds its greatest field of utility in the automatic operation of hydro-electric plants utilizing comparatively small sources of water power. By our invention the economic development of small or variable sources of power is made possible where such development would not be sufficiently profitable if attendants of the requisite skill were required to be continually on hand to operate the machinery. By our invention it becomes possible to operate a number of such hydro-electric plants in connection with a common net-work which may or may not have steam operated central stations connected thereto.

According to our invention when used in connection with hydro-electric plants, each plant is arranged to be started automatically and connected to the network whenever some predetermined condition occurs, such as when the head of water in the storage reservoir exceeds a predetermined value. Each plant is moreover arranged automatically to maintain its output at a value adjusted for that particular installation. When the operation of the plant has reduced the head of water to a value below which the turbines will not operate satisfactorily, the plant will be automatically disconnected from the line and the water shut off from the turbines until a sufficient head has again accumulated in the reservoir.

Where a number of such automatically operating plants are thus connected to a common network, some of the plants will normally be in operation and power available to consumers. Where the hydro-electric plants operate in conjunction with steam central stations the consumption of fuel will be greatly reduced since water power is used whenever it is available.

The number of turbines that may be simultaneously operated in a hydro-electric plant may be increased as the available head of water increases and according to our invention, where the conditions of stream flow make it economical to do so, we provide means to increase the number of units in operation as the water level rises. As the water falls these units are successively shut down.

In order to transmit the power generated economically, it is customary to use synchronous alternating current generators and an object of our invention is to provide reliable means for automatically starting and connecting a turbine driven synchronous generator to an alternating current network and causing it to assume its electrical load.

A further object of our invention is to produce a simple and reliable method of operation which has utility not only when the steps of control are performed automatically by our apparatus, but also where the series of acts are performed by other apparatus or even by hand.

Other objects of our invention will appear in the following description, taken in connection with the accompanying drawing in which the single figure is a diagram illustrating the apparatus employed and the connections used in one modification of our invention.

An alternating current generator 1, shown as a two-phase machine and driven by a waterwheel W, is adapted to be connected to a two-phase alternating current distribution system AC by means of a disconnecting switch 2 and a contactor 3. The distribution system AC may be supplied with power at several other different stations which may be either automatically or manually controlled, one such station being indicated at S. 4 represents a voltage reducing means and as shown consists of a reactance connected in series with each phase of the generator 1. A contactor 5 is arranged to short circuit the reactances 4. It is to be understood, however, that a resistance or a transformer with low voltage taps could be used in place of the reactances. The generator 1 may be of any suitable type, it being shown in the drawing as a revolving field type, the field being supplied with direct current through the slip rings 6.

7 represents an exciter which is driven by an induction motor 8 which is adapted to be connected to the system AC by means of a disconnecting switch 9 and a contactor 10. The exciter 7 may be of any suitable type, and preferably will be a compound-wound machine. The shunt field winding 10' is connected in series with an adjustable resistance 11 across the terminals of the exciter. 12 represents a relay connected across the terminals of the exciter and adapted to open a normally closed short circuit around the resistance 11 when the voltage of the exciter reaches a predetermined value. A switch 14 is arranged to connect one brush of the exciter 7 to the positive exciter bus 13 and the other brush to the negative exciter bus 13. In series with the last mentioned brush and the negative exciter bus there is arranged a series field winding 15.

The slip rings 6 of the generator 1 are adapted to be connected, in series with an adjustable resistance 16, to the exciter buses 13 by means of a contactor 17 and a switch 18. 19 represents a contactor which is arranged to short circuit a portion of the resistance 16 for a purpose hereinafter described. It will be observed that when the contactor 17 is in its normal position it closes a circuit through a discharge resistance 20 across the slip rings 6 of the generator 1.

21 represents a low voltage relay connected across the exciter buses 13 and controlling the circuit of the coil of a contactor 22.

24 represents diagrammatically a centrifugally operated switch connected to a rotating part of the generator 1, and is adapted to complete a circuit for the relay 25 when the speed of the generator reaches a predetermined value of approximate synchronous speed.

A' A" and B' B" represent the two phases of a low voltage operating bus which are connected to the phases of the system AC by means of two step down transformers 26.

The speed of the waterwheel W is controlled by varying the amount of water supplied thereto by adjusting the position of a gate 33 in the pipe supplying the waterwheel with water. In case the generating capacity of the automatic station is large relative to all the other stations connected to the system AC, it is preferable to control the position of the gate by means of a speed governor so as to maintain the frequency of the system constant. However in case the capacity is small relative to the other stations and these other stations are equipped to maintain the frequency of the system constant, there is no need of providing the waterwheel with a speed governor for controlling the gate opening as the other stations will hold the generator 1 in step. Thereby the large expense of a speed governor is eliminated.

In cases where it is not necessary to use a speed governor, we prefer to have the gate raised and lowered by means of a reversible motor. In the drawing we have assumed that the generating capacity of the automatic station is small relative to the other station S on the system AC and so we have shown the gates 33 as being arranged to be raised and lowered by an induction motor 34. The direction of rotation of the motor is controlled by contactors 37 and 38 which control the connections between the motor 34 and the control buses A' A" and B' B". The circuits for operating the contactors 37 and 38 will be hereinafter described. In order to stop the motor 34 when the gate is closed and when it is opened a predetermined amount, a switch 39 is provided for opening the circuits of contactors 37 and 38. This switch 39, as shown, consists of an extension 40 which moves up and down with the gate and is adapted to engage the projection 41 of a pivoted member to open the circuit through contacts 45 when the gate is opened a predetermined amount, and to engage projection 43 to open the circuit through contacts 46 when the gate reaches its closed position.

The operation of most of the relays and contactors, by means of which the generator 1 is automatically started up and connected to the system AC is controlled by a controller C. The function of the controller is to mechanically determine by means of the relative position of the contacts carried thereby, the sequence of operation of the relays and contactors it controls so that they can only operate in the right sequence and for the right length of time. In its preferred form we have illustrated this controller as being made up of fixed contact fingers leading to the windings of the various electromagnetic switches and of a cylindrical drum carrying metallic contacts by means of which the various fingers may be interconnected in the desired manner and in the desired sequence. This form of controller is well known in the art and no further description thereof is deemed herein necessary.

For the purpose of rotating the cylindrical drum of the controller C, we have illustrated a motor M which is mechanically connected thereto. Automatic means are provided for controlling this motor so that the station will be operated in response to certain predetermined conditions.

In the drawing, for the purpose of illustration, we have shown the station as being started when the water in the pond rises above a predetermined level, and as being stopped when the water drops below a predetermined level. We show a float switch 50, which may be of any suitable type, for connecting the contacts 51 together when the water is above a predetermined level and for disconnecting the contacts 51 when the water falls below another predetermined level.

The station may have, however, a plurality of generators in which case the float 50 may be arranged to close a plurality of contacts 51, one for each generator. Preferably, however, we provide a float switch for each generator and arrange them so that each one operates in response to a different water level. In this way, we are able to increase the number of units in operation whenever the condition of the reservoir makes it economical to do so, and to shut them down in succession as it becomes uneconomical to run the same.

In order to simplify the drawing we have shown the complete circuit arrangement of only one generating unit, but within the dotted rectangle in the upper right-hand corner we have diagrammatically illustrated a float switch 50' controlling contacts 51' of the circuit of the coil of a contactor 54' associated with another generating unit. Preferably this switch 50' would be arranged to start and stop its associated unit at different levels of the reservoir than the levels at which generator 1 is started and stopped.

The coöperation of the elements above described and function of the other elements shown will be more readily understood when considered in connection with their mode of operation, and to this end we will describe the operation of the generating station when water conditions are such as to enable it to be used.

Let it be assumed that the distribution system AC is supplied with energy at normal voltage from some other station or stations and that the switches 2, 9, 14, 18, 52, 53, and 65 are closed.

Let it also be assumed that the height of the water is such that the float switch 50 closes the circuit through contacts 51. A circuit is thereupon closed from phase A' A'' through contacts 51, coil of a contactor 54, switch 53 and a control switch 55 which is preferably situated at some distant point such as the despatcher's office or the main generating station when there are several stations connected to the same system, and is arranged, when open, to prevent the coil of contactor 54 from being energized consequently preventing the generating station shown from starting up. A control switch 56 is also provided at the distant point and is arranged to close the circuit of the winding of the contactor 54 independent of the position of the float switch 50. Therefore it will be observed that the station shown is also arranged to be started up independent of the condition of the float switch.

Contactor 54 upon becoming energized closes a circuit from phase A' A'' through fingers o and p and segments of the controller C in position k, which is the off position, to energize the coil of the contactor 57. The contactor 57 thereupon operates to complete the circuit of the motor M and the brake coil B in series therewith. The motor M thereupon moves the controller C into position a. The brake coil B is used in connection with an electromagnetically controlled brake and is so designed that when the coil is energized, a friction brake will be released, and when the coil is deënergized a friction brake will be applied.

In position a of the controller C a circuit from phase A' A'' through fingers o and aa and segments of the controller C, in position k, contacts of relay 25 which is not energized, the coil of contactor 22, and contacts of relays 59, 60, 61 and 62. Relay 59 is connected across the terminals of one of the transformers 26. The circuit of this relay is controlled by a centrifugal switch 63 connected to an induction motor 64 which in turn is connected to the system AC by means of a switch 65 and the transformers 26. The switch 63 is arranged to maintain the circuit of relay 59 closed unless the frequency of the system AC exceeds a predetermined number of cycles. Relay 60 is an inverse time relay and is connected to one phase of the generator 1 by the current transformer 66. In series with relay 60 is a contact making ammeter 69 which controls the circuits of relays 70 and 71. Relay 61 is an inverse time relay and is connected to the other phase of the generator 1 by the transformer 67. Relay 62 is a thermostat relay connected across phase B' B'' and is energized if all the thermostats 72, which are connected to different parts of the apparatus, are closed. These thermostats are arranged to open in case of an excessive temperature in the part of the apparatus on which they are applied.

The energization of the coil of the contactor 22 closes the contactor whereupon a circuit is closed through its lower interlock, fingers t and dd and segments of the controller C, and winding of relay 23 to phase A' A'' of the control circuit. The energization of relay 23 completes the circuit of contactor 10, which operates to connect the stator of the induction motor 8 to the system AC. Consequently the exciter 7 is brought up to normal speed and voltage very quickly. Relay 12, as above stated, is arranged to open the short circuit around the resistance 11 when the exciter voltage approaches its normal value. When the voltage of the exciter reaches a predetermined value the low voltage relay 21, which is connected across the exciter buses becomes energized and closes a holding circuit for the coil of contactor 22 through its top interlock, fingers v and o and segments of the controller C so that the contactor 22 stays closed after finger $aa$ of the controller leaves position $b$, unless the exciter voltage drops below the predetermined value.

In the meantime the controller C has been rotating due to the circuit of the motor M being closed by the contactor 57. In position $b$ of the controller a circuit is completed through the bottom interlock of contactor 22, fingers $t$ and $s$ and segments of controller C to a point between the contacts of relays 70 and 71. As the generator 1 is not connected to the system AC, there is no current flowing in the contact making ammeter 69 so that its movable contact is in engagement with the upper stationary contact. This ammeter may be of any suitable type and its movable contact is arranged to be in engagement with the upper stationary contact until the current in the generator 1 exceeds a predetermined value at which time the movable contact engages the lower stationary contacts. With the movable contact of the ammeter in engagement with the upper stationary contact and the control switch 74 at the distant point closed, the coil of relay 71 is energized. The above traced circuit to the point between the contacts of relays 70 and 71 is thereby extended through the contacts of relay 71, contacts 45 of the limit switch 39, coil of the contactor 38, and contacts of contactor 37, to phase A' A''. Contactor 38 closes and completes the circuit to the gate motor 34 so that it starts in the proper direction to open the gate 33 of the waterwheel W. The segments of the controller C are arranged so that the above circuit for the coil of contactor 38 is maintained a definite length of time which is sufficient to give a gate opening of such an amount that the speed of the generator is brought up to approximately synchronous speed. When the controller leaves position $c$ the circuit of the coil of the contactor 38 is opened to stop the gate motor 34 until the generator is connected to the system AC, as will hereinafter be described.

In position $a$ and $b$ of the controller C the contactor 57 has been receiving its energy through fingers $o$ and $p$ of the controller. When the controller moves into position $c$, this circuit of the contactor 57 is broken and the controller stops in this position waiting for the generator 1 to come up to speed. When the speed of the generator 1 reaches a predetermined value, usually a few revolutions per minute below its normal speed, the centrifugal switch 24 closes, thereby completing a circuit from phase A' A'' through the contact of contactor 54, fingers $o$ and $z$ and segments of the controller C, contacts of the centrifugal switch 24, fingers $y$ and $q$ and segments of the controller C, and the coil of the contactor 57. Contactor 57 then closes the circuit of the motor M to start the controller again. In position $d$ of the controller the above traced circuit for the coil of contactor 57 is closed through fingers $o$ and $p$ of the controller.

The gate opening is such that the speed of the generator 1 is slowly increasing, so that by the time the finger $x$ comes into contact with the segment of the controller, the speed of the generator is approximately normal. The engagement of finger $x$ with the segment of the controller completes a circuit from phase A' A'' through lower contact of the contactor 22, fingers $t$ and $x$ and segments of the controller C and coil of contactor 3. Contactor 3 closes and connects the generator to the system AC without any excitation and with the reactances 4 in series; the purpose of the reactance being to reduce the voltage applied to the generator and thereby limit the initial rush of current through the generator windings when the circuit is closed.

When the controller C reaches position $f$ a circuit is completed from phase A' A'' through lower contact of contactor 22, fingers $t$ and $bb$ and segments of the controller C and coil of contactor 17. Contactor 17 operates and opens the circuit through the discharge resistance 20 across the slip rings 6, and closes a circuit from the positive exciter bus 13 through right-hand contact of switch 18, middle contacts of contactor 17, right-hand slip ring 6 of the generator 1, field winding of the generator, left-hand slip ring 6, all of resistance 16, upper contacts of contactor 17, left-hand contacts of switch 18, to the negative exciter bus 13, thereby causing a small field current to flow through the field winding of the generator 1 to pull it into synchronism with the system AC. A small field current is used so as to cause as little disturbance on the system AC as possible.

When the controller C reaches position $g$ the above traced circuit for the coil of contactor 38 is again completed by contact fingers $s$ and $t$, to start the gate motor operating to open the gate. A circuit is also completed from phase A' A'', through fingers $t$ and $cc$ and segments of the controller C, coil of the contactor 19 and contacts of an instantaneous overload relay 68. Contactor 19 closes and short circuits a predetermined portion of the resistance 16, thus strengthening the field current to its normal value.

When the controller reaches position $h$ a circuit is completed from phase A' A'' through fingers $t$ and $w$, contacts of a relay 68, and coil of contactor 5 to short circuit the reactances 4. In position $h$, which is the running position, the circuit of the coil of contactor 57 is broken through finger $p$ so that the controller motor M stops.

The generator is now properly connected and when the current delivered to the system AC reaches a predetermined value the movable arm of the contact making ammeter disengages its upper contact and thereby stops the gate motor opening the gate. If the current increases above the predetermined value the movable arm of the ammeter engages the lower contacts and thereby closes a circuit for coil of relay 70 which in turn closes a circuit for the coil of contactor 37. Contactor 37 closes and completes a circuit for the motor 34 to cause it to close the gate opening, thereby decreasing the load carried by the generator. It will therefore be observed that the load carried by the generator is maintained constant by the contact making ammeter 69. The station continues to run and supply energy to the system AC until a predetermined condition occurs to cause the station to automatically shut down.

The station shown in the drawing may be shut down in response to any one of several different conditions. If the level of the water falls below the predetermined level, due to the fact that the demand for water is greater than the flow of the river, the float switch 50 will open the circuit of contactor 54 at contacts 51. Contactor 54 opens and interrupts the locking circuit of the coil of contactor 22. Contactor 22 opens and interrupts the circuits of contactors 3, 5, 17 and 19 and relay 23. The opening of contactor 3 disconnects the generator 1 from the system AC. The deënergization of relay 23 opens the circuit of the coil of contactor 10, thereby causing the contactor 10 to open and disconnect the inductor motor 8 from the system AC and the opening of contactors 17 and 19 restores the field circuit of the generator to its idle condition.

If there are a number of generating units in the station, which are arranged to be shut down in succession in response to different levels of the water in the reservoir, and these generating units are shut down in response to lower levels than that at which the generator shown in the drawing is shut down, it would be necessary to maintain the exciter set running in order to furnish exciting current to the generators which are still connected to the system. Therefore each of the other generators is provided with a relay 23' which is similar to relay 23 and which closes a circuit in multiple with the contacts of relay 23, so that the circuit of contactor 10 is not opened when the generator 1 is shut down but is held closed until all the relays 23' are deënergized.

The opening of contactor 22 also closes a circuit for the coil of contactor 57, to start the motor M again to move the controller to its off position, from the phase A' A'' through the upper interlock of contactor 22, fingers $y$ and $q$ and segments of the controller C and coil of the contactor 57. The opening of contactor 22 also closes a circuit through its middle interlock, contacts 46 of the gate switch 39 and coil of contactor 37. Contactor 37 closes and completes a circuit for the gate motor to close the gate. When the gate is closed, limit switch 41 is operated to open the circuit of the coil of contactor 37 at contact 46 to stop the motor 34.

When the controller C reaches position $j$ a circuit in parallel with the middle interlock of the contactor 22 is completed through fingers $r$ and $u$ and segments of the controller. This circuit is closed so as to provide additional contact surface.

When the controller C reaches position $k$, which is the off position, the circuit of the contactor 57 is opened to stop the motor M. The station is now in condition to be started again.

If it is desired to shut down the station independent of the water level, control switch 55 can be opened. This causes the contactor 54 to open; thereby causing contactor 22 to open, whereupon the station is shut down in the manner above described.

It will be observed that relays 59 and 62 are connected to the transformers 26 so that the station cannot start up or continue to run unless the system AC is energized. Relay 62 also prevents the station from running if the temperature of the apparatus exceeds a predetermined value.

For the protection of the apparatus involved the circuit of the coil of contactor 22 is completed through the contacts of a number of protective relays. In case of a failure of voltage on the distribution system AC or in case the frequency of the system exceeds a predetermined value so as to cause the centrifugal switch 63 to operate, relay 59 deënergizes and opens the circuit of the coil of contactor 22, whereupon the station automatically shuts down in the manner described. When the controller C reaches its off position $k$, the circuit of the coil of contactor 57 is closed through the contacts 51 of the float switch 50 if the water level is above the predetermined value to move the controller through positions $a$ and $b$ and into position $c$. The closing of the circuit for the coil of the contactor 22 is not completed in position $a$ of the controller due to the thermostat relay being deënergized; so that the circuits through the coils of the other contactors are not closed to start up the station. In positions $c$ to $k$ of the controller the above traced circuit for contactor 57 is closed through fingers $y$ and $q$ to complete the circuit of the motor 7. It will therefore be observed that the controller keeps on running if the water is above the predetermined level but that the station is not started up. When the apparatus cools off so that the thermostat relay 62 is again energized the station is automatically started up in the manner above described. It will be observed, however, that operating circuit of contactor 22 can only be closed in position *a* and *b* of the controller so that the exact sequence of operation is secured and there is no danger of a wrong connection.

If the power transferred from the generator 1 to the system AC exceeds a predetermined amount, the relays 60 or 61 or both will be energized and will likewise open the circuit of the coil of contactor 22 to shut down the station. It is desirable, however, that the station should shut down only in response to extreme overloads or very heavy overloads which are maintained for relatively long periods. Therefore relays 60 and 61 are of the inverse time limit type. In order to limit the current to prevent the station shutting down in response to normal overloads, the instantaneous relay 68, connected in series with relay 61, is provided and is designed to operate as soon as the current exceeds a predetermined amount to open the circuit of the coil of contactors 5 and 19. Contactor 5 opens and inserts the reactances 4 between the generator and the main AC system and contactor 17 opens and breaks the short circuit around a portion of the field resistances 16. The insertion of the reactances 4 and the decreasing of the field current tends to diminish the power delivered but if the overload continues the relays 60 and 61 will open after a predetermined interval and shut the station down.

Control switches 74, 77 and 78 are provided for controlling the gate opening independent of the contact making ammeter 69, and may be situated at some point outside of the station. It will be observed that when control switch 74 is open, the movable arm of the contact making ammeter 69 is deënergized and thereby the ammeter control is cut out, and when control switch 77 is closed, a circuit for the coil of contactor 37 is closed to cause the gate motor 34 to operate to shut the waterwheel gate and when control switch 78 is closed a circuit of the coil of contactor 38 is closed to cause the gate motor 34 to operate to open the waterwheel gate. In case the controlling station is a long distance from the generating station it may be preferable to arrange the switches 53, 56, 74, 77 and 78 for remote electromagnetic control. It is evident therefore that we have also provided means for varying at will the load carried by the station.

While we have shown and described our invention mainly in connection with hydroelectric plants in which the automatic operation is initiated in response to the height of water in a storage reservoir, it will be obvious to those skilled in the art that certain methods and combinations, which are disclosed, are capable of use in other relations, and that these features will be of peculiar utility whether the initial control circuit is closed manually or automatically in response to some predetermined condition of the distribution system such as the voltage, current or frequency which indicates the necessity of additional generation capacity. It will also be obvious to those skilled in the art, that, as far as certain broad features of our invention are concerned, variable sources of energy, other than water power, may be used where available. Moreover, while we have shown particular apparatus for performing certain automatic operations, our invention is not limited to the specific apparatus illustrated. We therefore intend to cover all such modifications and applications which fall within the true spirit and scope of our invention as set forth in the appended claims.

What we claim as new and desire to secure by Letters Patent of the United States, is,—

1. In combination, an alternating current distribution system, a generator adapted to supply electrical power thereto, a prime mover for said generator, a source of energy for driving said prime mover, and means for automatically starting said generator from rest, bringing said generator into step with said system and controlling the amount of energy supplied to said prime mover to cause said generator to assume a portion of the load on said system.

2. In combination, an alternating current distribution system, a generator adapted to supply electrical power thereto, a prime mover for said generator, a source of energy for driving said prime mover, and means responsive to a predetermined condition of said source of energy for automatically starting said generator from rest, bringing said generator into step with said system and controlling the amount of energy supplied to said prime mover to cause said generator to assume a portion of the load on said system.

3. A system of distribution wherein a plurality of prime mover dynamo plants are adapted to supply energy to a common network and wherein certain of said plants are operated from variable sources of fluid supply characterized by the fact that means responsive to the condition of the fluid supply are provided to start such plants into operation and cause them to supply energy to the network during the time that the fluid energy of the supply exceeds a predetermined minimum.

4. The method of synchronizing and applying load to a prime mover dynamo plant adapted to supply energy to an alternating current network and comprising a synchronous alternating current generator, a motor for driving the same, and exciting means for the generator, which comprises, connecting said generator to said network with the field unexcited, supplying excitation current to bring the generator into synchronism and then adjusting the energy supplied to said motor to cause said generator to take its normal load.

5. The method of starting, synchronizing and applying load to a prime mover dynamo plant adapted to supply energy to an alternating current network and comprising a synchronous alternating current generator, a fluid motor for driving the same, and exciting means for the generator, which comprises, admitting fluid to the motor to an amount sufficient to cause the generator to rotate at a speed near synchronism, connecting the generator to the network while maintaining the field unexcited, and then supplying excitation current to the field winding of the generator to bring it into synchronism, and increasing the fluid admission until the machine takes its normal load.

6. The method of starting, synchronizing and applying load to a prime mover dynamo plant adapted to supply energy to an alternating current network and comprising a synchronous alternating current generator, a fluid motor for driving the same, exciting means for the generator, which comprises, admitting fluid to the motor to an amount sufficient to cause the generator to rotate at a speed near synchronism, connecting the generator to the network while maintaining the field unexcited, supplying a low value of excitation current to bring the generator into synchronism, and then increasing said excitation current, and the fluid admission until the generator takes its normal load.

7. The method of starting, synchronizing and applying load to a prime mover dynamo plant adapted to supply energy to an alternating current network and comprising a synchronous alternating current generator, a fluid motor for driving the same, exciting means for the generator, and means adapted to supply reduced voltage to the generator when connected to the network as a motor, which comprises, admitting fluid to the motor to an amount sufficient to cause the dynamo electric machine to rotate at approximately synchronous speed, connecting the machine to the network through said voltage reducing means while maintaining the field winding unexcited, supplying excitation current to bring the machine into synchronism, and then establishing full voltage connection of the generator to the network, and increasing the fluid admission until the machine takes its normal load.

8. The method of starting, synchronizing and applying load to a prime mover dynamo plant adapted to supply energy to an alternating current network and comprising a synchronous alternating current generator, a fluid motor for driving the same, exciting means for the generator, and reactance means, which comprises, admitting fluid to the motor to an amount sufficient to cause the dynamo electric machine to rotate unloaded at approximately synchronous speed, connecting the machine to the network through the reactance while maintaining the field winding unexcited, supplying a low value of excitation current to bring the machine into synchronism, then increasing the excitation, eliminating the reactance from the circuit, and increasing the fluid admission until the machine takes its normal load.

9. In combination, a distribution system, a plurality of generators adapted to be connected to said system to supply power thereto, means for starting said generators and connecting them to said system, exciting means arranged to supply exciting current to all of said generators, and means arranged automatically to start said exciting means operating when the first generator is to be started and to maintain said exciting means in operation as long as any one of said generators is supplying power to said system.

10. In combination, a system of distribution, a plurality of generators adapted to be connected to said system to supply energy thereto, means for driving said generators adapted to be supplied from a source of energy, means responsive to a predetermined condition of said source, means controlled by said energy responsive means for automatically starting said generators and connecting them to said system in succession, exciting means arranged to supply exciting current to all of said generators, means controlled by said energy responsive means for initiating the operation of said exciting means when the first generator is to be started, and means arranged to maintain said exciting means in operation as long as any one of said generators is supplying energy to said system.

11. In combination, an alternating current distribution system, a hydro-electric plant adapted to be connected to supply energy to said system comprising a turbine driven alternating current generator, means for controlling the fluid supply to the turbine, means responsive to the available head of water for controlling said fluid supply controlling means to start the turbine and bring the generator approximately to synchronous speed, means responsive to the speed of the generator for controlling the connection of the generator to the distribution system, and means responsive to the output of the generator for controlling said fluid supply controlling means.

12. In combination, a distribution system, a plant adapted to be connected to and to supply power to said system comprising a fluid motor driven generator, means for controlling the fluid supply to the motor, means responsive to the quantity of fluid available for controlling said fluid supply controlling means to start the motor and connect the generator to said system, means responsive to the output of the generator for controlling said fluid supply controlling means, and means adapted to control said fluid supply controlling means independently of either said quantity responsive means or said output responsive means.

13. In an alternating current distribution system, a generator adapted to supply electrical power thereto, a prime mover for said generator, a source of energy for driving said prime mover, means for controlling the amount of energy supplied to said prime mover, means for automatically operating said controlling means to bring said generator up to approximately synchronous speed, connecting said generator to said system and bringing it into step, and means responsive to the power transferred from said generator to said system for controlling the amount of energy supplied to said prime mover after said generator is connected to said system.

14. In combination, a distribution system, a generator adapted to be connected to said system to supply power thereto, a prime mover for said generator, a source of energy for operating said prime mover, means for connecting said source of energy to said prime mover to operate the same, means for connecting said generator to said circuit, means for mechanically controlling the sequence of operation of said connecting means, and means for controlling the operation of said mechanical controlling means.

15. In combination, a distribution system, a generator adapted to be connected to said system to supply power thereto, a prime mover for said generator, a source of energy for operating said prime mover, means for connecting said source of energy to said prime mover to operate the same, means for connecting said generator to said circuit, a motor operated controller for mechanically determining the sequence of operation of said connecting means, said controller being arranged to open the circuit of its driving motor when the generator is connected to said circuit, and means responsive to abnormal conditions of said generator for closing the circuit of said motor to move said controller to its initial position.

16. In combination, an alternating current distribution system, a generator adapted to be connected to said system to supply power thereto, a prime mover for said generator, a source of energy for operating said prime mover, means for controlling the amount of energy supplied to said prime mover, a reactance, means for connecting said generator to said system in series with said reactance, means for short-circuiting said reactance, a source of exciting current for said generator, a field resistance, means for connecting said source of exciting current to the field winding of said generator in series with said resistance, means for short-circuiting a portion of said field resistance, means for mechanically controlling the sequence of operation of said means, and means for controlling the operation of said mechanical controlling means.

17. In combination, an alternating current distribution system, a generator adapted to be connected to said system to supply power thereto, a prime mover for said generator, a source of energy for operating said prime mover, means for controlling the amount of energy supplied to said prime mover, a reactance, means for connecting said generator to said system in series with said reactance, means for short-circuiting said reactance, a source of exciting current for said generator, a field resistance, means for connecting said source of exciting current to the field winding of said generator in series with said resistance, means for short-circuiting a portion of said field resistance, means for mechanically controlling the sequence of operation of said means, and means responsive to predetermined conditions of said source of energy for controlling the operation of said mechanical controlling means.

In witness whereof, we have hereunto set our hands this 6th day of September, 1919.

EDWIN W. ALLEN.
EDWARD TAYLOR.